(12) United States Patent
Woodall et al.

(10) Patent No.: US 8,600,178 B1
(45) Date of Patent: Dec. 3, 2013

(54) GLOBAL MOTION VECTOR CALCULATION USING PHASE PLANE CORRELATION

(75) Inventors: Neil D. Woodall, Newport Beach, CA (US); Guodong Liu, Shanghai (CN); Minghui Yang, Shanghai (CN)

(73) Assignee: Pixelworks, Inc., Portland, OR (US)

( * ) Notice: Subject to any disclaimer, the term of this patent is extended or adjusted under 35 U.S.C. 154(b) by 215 days.

(21) Appl. No.: 13/168,744

(22) Filed: Jun. 24, 2011

(51) Int. Cl.
*G06K 9/36* (2006.01)

(52) U.S. Cl.
USPC ........................................................ 382/236

(58) Field of Classification Search
USPC .......... 382/232, 236, 248; 348/451–452, 459; 375/240.16, 240.24
See application file for complete search history.

(56) References Cited

U.S. PATENT DOCUMENTS

| | | | |
|---|---|---|---|
| 5,005,078 A * | 4/1991 | Gillard | 348/452 |
| 8,184,200 B1 * | 5/2012 | Biswas et al. | 348/459 |
| 8,233,730 B1 * | 7/2012 | Namboodiri et al. | 382/236 |
| 8,311,116 B2 * | 11/2012 | Namboodiri et al. | 375/240.16 |

* cited by examiner

*Primary Examiner* — Jose Couso
(74) *Attorney, Agent, or Firm* — Marger Johnson & McCollom PC

(57) ABSTRACT

A method of performing motion compensation includes dividing at least one frame of image data into blocks, performing phase plane correlation to determine a correlation surface for each block between a first frame and a second frame, using the correlation surfaces for each block in the first frame to produce a global correlation surface for a first frame, using the global correlation surface to produce a refined correlation surface, selecting peaks in the refined correlation surface, and perform sub-pixel motion vector calculations to produce global motion vectors using the peaks.

7 Claims, 6 Drawing Sheets

GLOBAL MOTION VECTOR CALCULATION USING PHASE PLANE CORRELATION

BACKGROUND

Frame interpolation creates an image frame from neighboring images. The neighboring images may be fields in an interlaced video format, used to form a frame of data, or neighboring frames of a soon-to-be-created frame.

In the simplest approach, one could increase the frame rate by repeating the most recent frame until the next frame is ready for display. However, this does not account for moving objects which may appear to jump from frame to frame and have flickering artifacts.

Motion estimation and motion compensation techniques may alleviate some of these issues. These techniques rely upon motion vectors to shift the image data for the moving object to the correct position in interpolated frames, thereby compensating for the motion of the object. Difficulties arise in the estimation of motion and the selection of the correct motion vector in the regions of the image where the moving object resides. These regions may have background areas that are initially uncovered in the background, but become covered by the object in motion. Similarly, these background regions may be initially covered by the object, and then become uncovered as the object moves away. For purposes of this discussion, these regions will be referred to as uncover/cover regions. In either case, selection of motion vectors becomes difficult.

Motion estimation and motion compensation techniques typically segment the frame into blocks. The techniques employ motion vectors for each block, so they must select a motion vector. The selection of motion vector is generally between the motion vector of the background region or of the object. When an algorithm must make a selection between these two motion vectors, regions may exist for which the algorithm may not have a clear choice. Typically, the algorithm will select the background motion vector as a default. In some instances, the process may use the global motion vector instead of the background motion vector because the global motion vector typically closely matches the background motion vector.

Current techniques typically average the motion vectors for the whole frame, meaning averaging the motion vectors from each block. Alternatively, they use the most common motion vector among the block motion vectors. In either case, the motion vectors are close to the correct motion vector, but not as accurate as they could be. Further, it is not possible to provide a sub pixel accurate estimate.

DETAILED DESCRIPTION OF THE EMBODIMENTS

Figure 1:
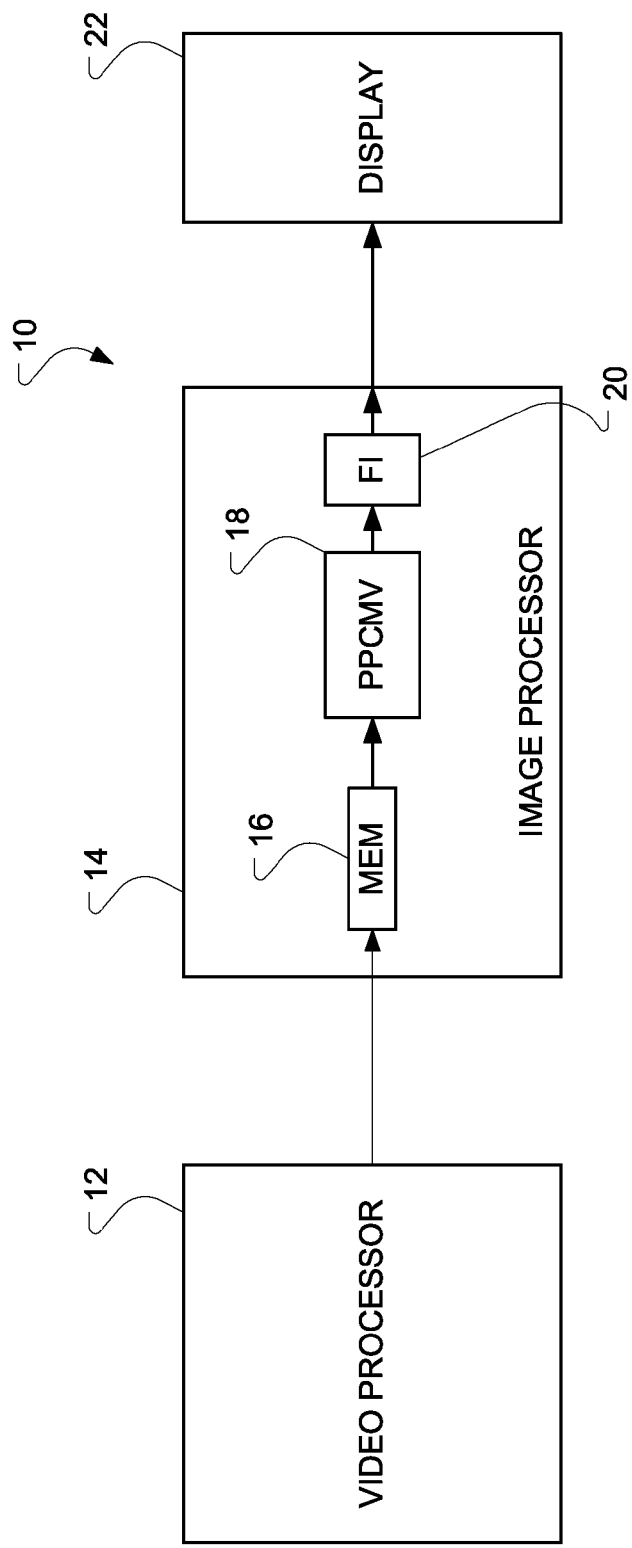
FIG. 1 shows an embodiment of a digital display system.

FIG. 1 shows a block diagram of a digital display system 10. A video processor 12 may receive video signals from a variety of video sources. The video, or system, processor outputs the image data to the image processor 14. The image processor may include a memory 16 for storing one or more frames of image data. The processor also includes a phase plane correlation motion vector module (PPCMV) 18.

The PPCMV module 18 detects motion between frames of image data in the form of motion vectors. The frame interpolation module 20 uses this information to interpolate new frames between the original frames used in the motion detection process, increasing the frame rate of the system. This process usually occurs when a system displays frames at a rate higher than the native incoming video data, or may occur in systems that use higher frame rates for clearer displays. The frame interpolation module 20 sends the resulting image frames to the display 22.

One must note that the video processor and image processor division of tasks may differ from system to system. In some systems, the video processor may perform all or a portion of the tasks discussed relative to the image processor here. The image processor may consist of a portion of the video processor's capabilities or may take the form of an application-specific integrate circuits, logic within the video processor or a separate processor, etc. No limitation is intended nor should any be implied by the arrangement of processors or logic circuits here.

Figure 2:
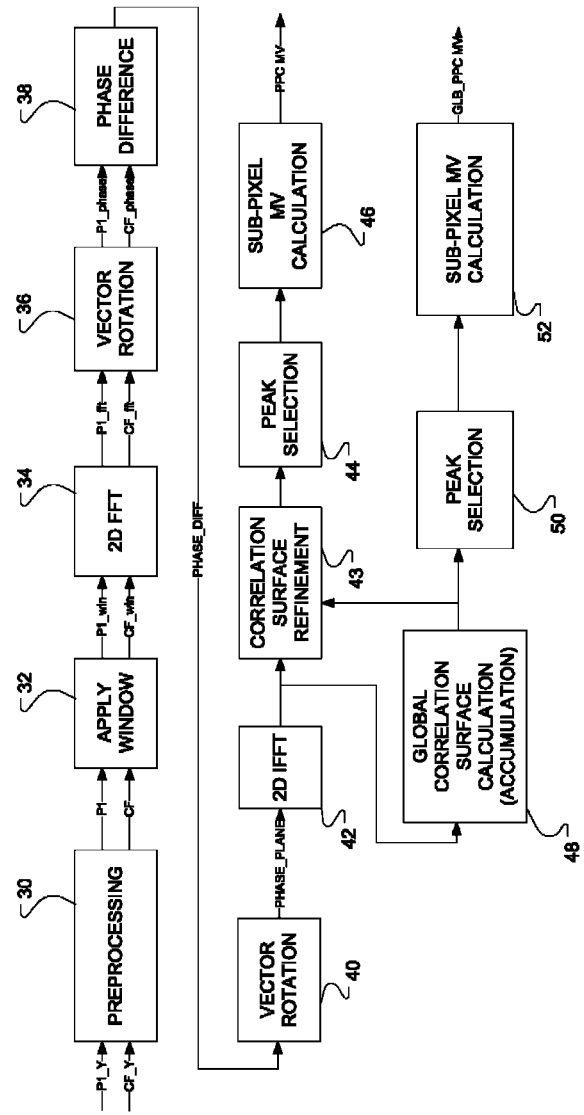
FIG. 2 shows a block diagram of an embodiment of a method to determine global motion vectors.

Turning now to the phase plane correlation process, FIG. 2 shows an embodiment of a phase plane correlation process with an embedded global motion vector determination. As mentioned above, global motion vectors provide a default motion vector that may be used during the motion vector detection process.

At block 30, the preprocessing block receives image data for the current frame CF and the previous frame P1. In this embodiment, the data received is the luminance (Y) data. The pre-processing block passes the frame data P1 and CF to the windowing module 32. The window module will be discussed in more detail with regard to FIG. 4. The window module provides the P1_W and CF_W data to a two dimensional Fast Fourier Transform module 34. The outputs of this module then undergo vector rotation, such as by CORDIC (COordinate Rotational DIgital Computer) at 36 to produce the P1_phase and CF_phase data. These two phases are then compared at 38 to determine the phase difference between them, indicative of motion, resulting in phase difference data, phase_diff.

The phase difference data then undergoes vector rotation at 40 and inverse two dimensional Fast Fourier Transform processing at 42. This produces the correlation surface for that block. At this point, the processing will generally perform the phase plane correlation motion vector (PPCMV) analysis first and then the global motion vector analysis. This allows the same hardware to be used for each process. In the PPCMV analysis, the correlation surface is used to detect peaks. Peaks showing in the correlation surface result from motion.

If there is a peak in a region at 44, such as a 2×2 square and the 3 adjacent values have close to the same value, the motion vector is not the peak. If the 8 adjacent values in a 3×3 square are all about the same, the peak represents the motion vector. To obtain the sub-pixel motion vector, the peak and the neighbors of the peak are used to determine the actual peak. There are several methods that can be used for this function, in one implementation a parabolic function is used. This is then used to perform the sub-pixel motion vector calculation at 46 for the PPCMV process. The peak detection process will be discussed in more detail with regard to FIG. 6.

Once this process complete, the global motion detection process occurs. As an overview, a global correlation surface is accumulated from the individual block correlation surfaces at 48. The peak selection process at 50 now looks at the global correlation surface to detect peaks that indicate motion. These peaks are then used as motion vectors for sub-pixel motion vector calculations at 52, resulting in global motion vectors to be further employed in the frame interpolation process.

Figure 3:
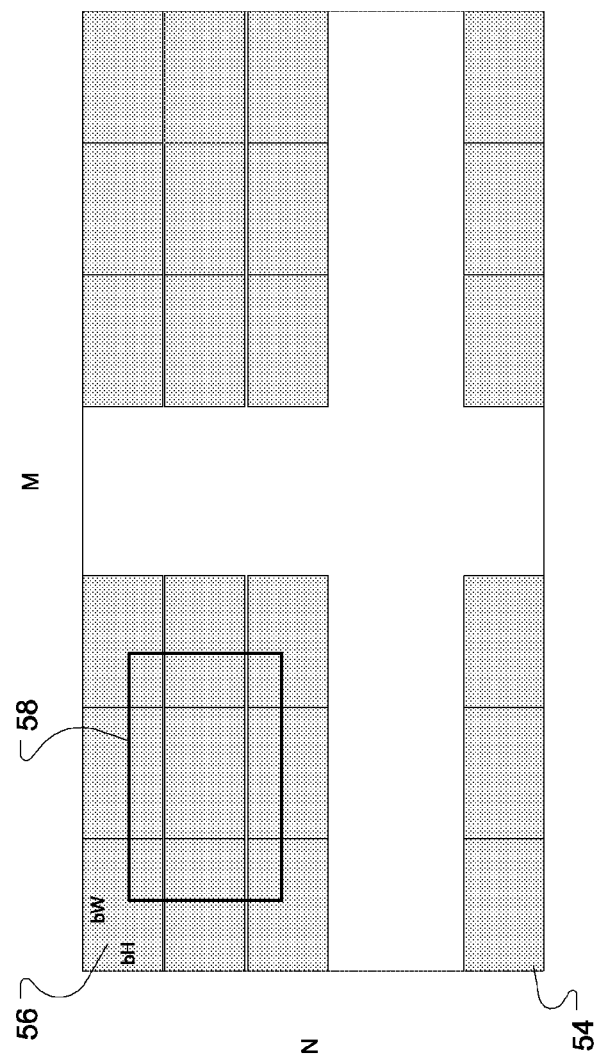
FIG. 3 shows an example of an image frame divided into blocks and having overlapped blocks.

Within this overview, the discussion now turns to particular aspects of the process. FIG. 3 shows an example of a frame of image data 54 divided into an M×N array of blocks, each block such as 56 having dimensions of bW×bH. These blocks are those that undergo processing in the PPCMV process, as well as those that are accumulated in the global motion vector process. In order to get an accurate motion vector, the blocks should be overlapped. In one embodiment, the overlapping block 58 has a dimension of 2bW×2bH.

An issue that arises with the blocks results from a block boundary influence in which the edges of the blocks tend to have 0 motion vectors. Because of that, the central portion of the block should be given larger weight in determining the motion vector, with the portions farther from the center given smaller weights. In one embodiment, a windowing function such as that shown at 32 in FIG. 2 is applied. One example of such a windowing function is a two dimensional, symmetric, separable window function $$w(x,y)=w(x)*w(y).$$

Other frequently used windowing functions including Hamming windows developed by Richard W. Hamming, and the Hann window, developed by Julius von Hann.

Figure 4:
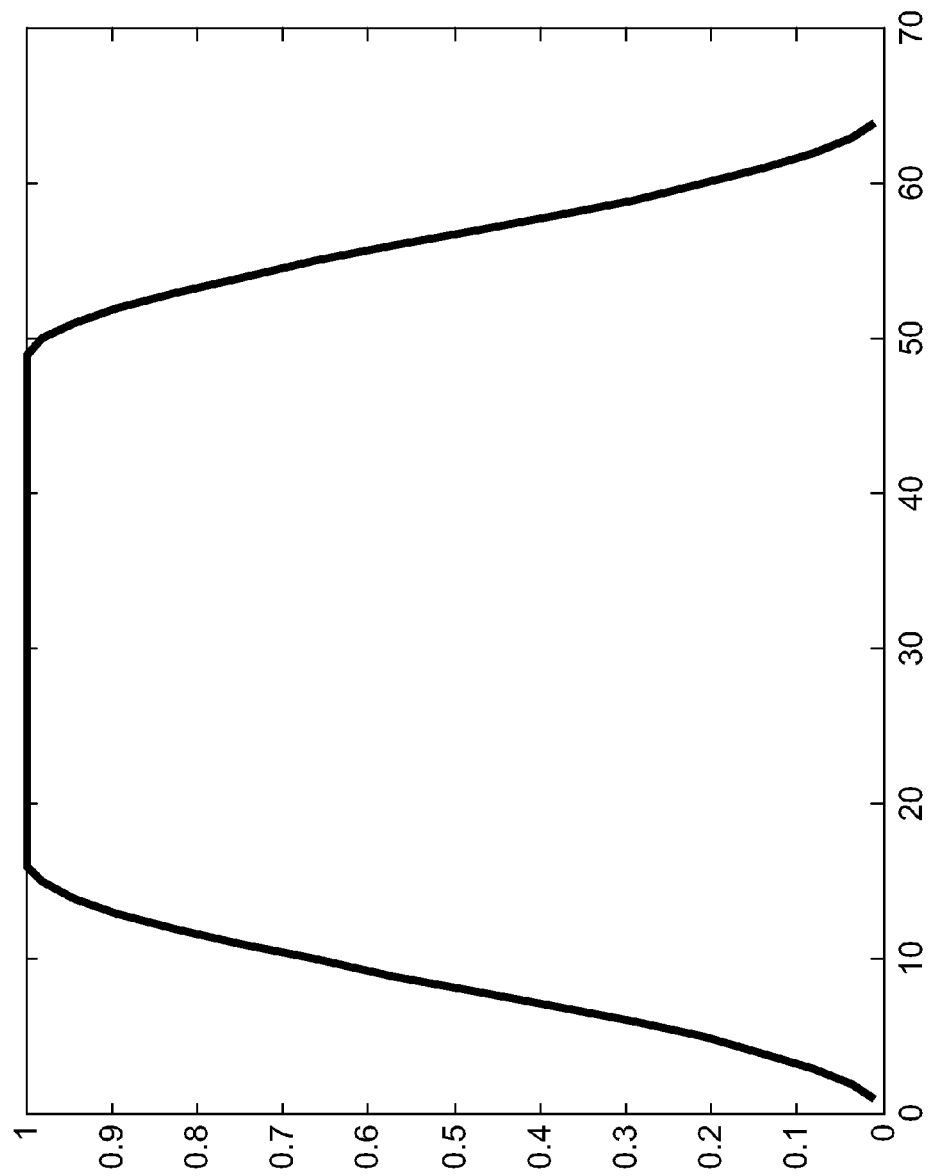
FIG. 4 shows an example of a window function applied to an overlapped block.

FIG. 4 shows an example of a Hamming window function. As can be seen here, the values to the center of the block are weighted much more heavily than the values of the edges or boundaries of the block. This weighting affects the resulting phase plane that emerges after the differencing of the two phases. Returning to FIG. 2, one can see that the correlation surface is obtainable after the two dimensional inverse FFT is applied at 42. The correlation surface is used in both the PPCMV process and the global PPCMV process.

In accumulating the global correlation surface, which is a summation of the correlation surface of each block, a similar effect to the block boundary effect exists, but at the image boundary level. In one embodiment, this is achieved using a blending coefficient, $w_k$. In this embodiment, the elements of a global correlation surface matrix are initialized glb_surf=0. As each correlation surface of each block k of the PPC blocks, they are accumulated as glb_surf+=$w_k$*corr_surf$_k$.

The process then applies the global correlation surface of the previous frame to the correlation surface of each PPC block in the current frame. For example, assume the PPCMV and the global PPCMV has been calculated between frames n−2 and n−1, where n is the current frame. The global correlation surface between these two frames, glb_surf$_{n-1}$ is stored into memory.

The process continues to calculate the PPCMV for each block k between frames n−1 and n. After obtaining the correlation surface for that block, corr_surf$_k$, for that block, it may be refined at 43 by the glb_surf$_{n-1}$, $$ref\_surf_k=corr\_surf_k+wr_k*glb\_surf_{n-1}.$$

The parameter $wr_k$ should be adjusted according to whether the current block is near the image boundary. The weight is applied to the previous glb_surf, so a higher weight means less weight to the current block, the equation is one example of how to give less weight to the boundary blocks. The refined correlation surface may then be used for peak selection and sub-pixel calculation for the PPCMV process for this block. The refined correlation surface may make the result more stable and accurate. The addition of the global correlation surface has the effect of deemphasizing the peaks caused by the border of the image.

In an alternative embodiment, the global correlation surface value can be incorporated into the individual PPC blocks by initializing the matrix with that value. One would then only have to multiply the matrix by a value only once, instead of for each block. For example, in one block one could use ¼ for the weight of the border blocks and 0 as the weight of the inside blocks.

Figure 5:
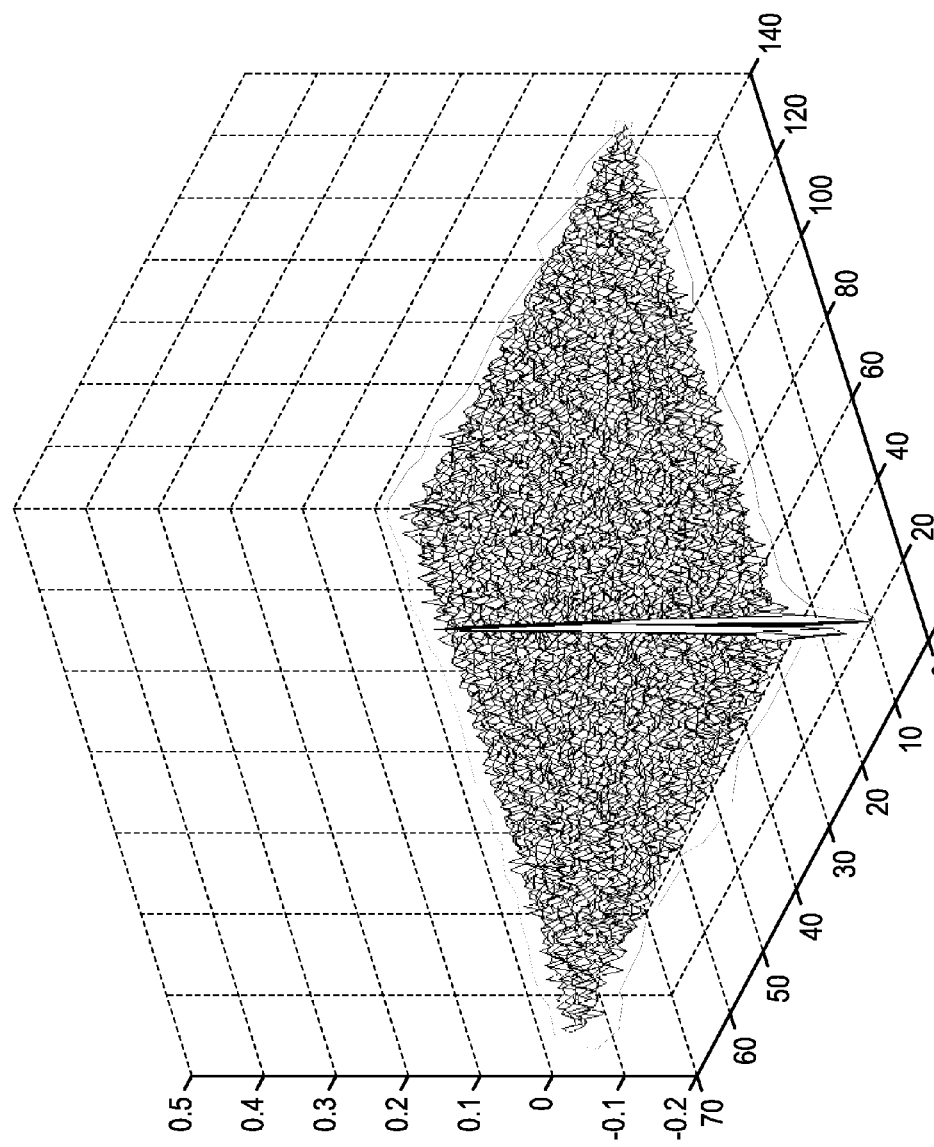
FIG. 5 shows an embodiment of a correlation surface of a block.

The correlation surfaces are then searched for peaks, an example of which is shown in FIG. 5. This process will result in the motion vectors. Sub-pixel accuracy of the global motion vectors is obtained by separable-variable fitting in the neighborhood of each peak. The correlation surface around each peak is assumed as a parabolic function $f(x)=k(x-a)^2+b$ in horizontal and vertical directions, respectively. For the peak at point (x,y) the sub-pixel parts (dx, dy) of the motion vector would be found by the following:

$$dx = \frac{c(x+1, y) - c(x-1, y)}{2(c(x, y) - c(x-1, y) - c(x+1, y))}$$

$$dy = \frac{c(x, y+1) - c(x, y-1)}{2(c(x, y) - c(x, y-1) - c(x, y+2)}$$

where c is the correlation value in either the global correlation surface or the refined correlation surface.

Figure 6:
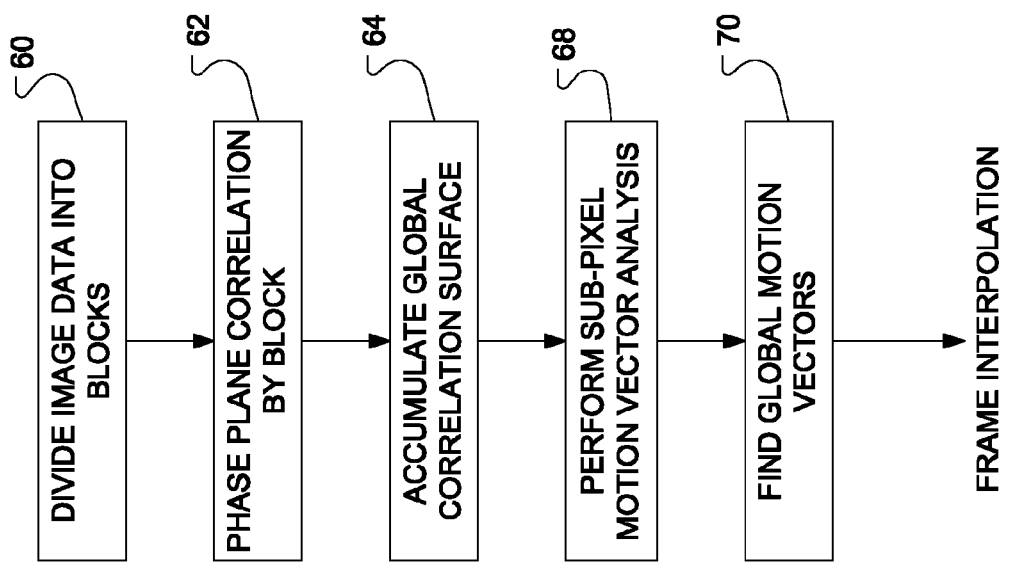
FIG. 6 shows a flowchart of an embodiment of a method of determining global motion vectors.

FIG. 6 shows a flowchart of this embodiment of finding the global motion vectors within a PPC process such as the one shown in FIG. 2. At 60, the image data for the current frame is divided into blocks. The process performs phase plane correlation by blocks for that frame at 62. The global correlation surface is then accumulated at 64. The sub-pixel motion vector analysis is then performed at 68 for the global motion vectors, resulting in the global motion vectors at 70. The global motion vectors are then used in the frame interpolation process.

In this manner, a more accurate determination of the global motion vectors becomes available for the frame interpolation process. This results in a more accurately rendered interpolated frame. This increases the overall quality of the displayed video. The methods and apparatus generates a global correlation surface by accumulating the individual correlation surfaces, may use weights based on the spatial position of the blocks, can generate global MV using the global correlation surface, and refines the individual PPC motion vectors by doing a weighted sum based on spatial position between the global correlation surface and the individual correlation surface.

Thus, although there has been described to this point a particular embodiment for a method and apparatus for determining global motion vectors, it is not intended that such specific references be considered as limitations upon the scope of this invention except in-so-far as set forth in the following claims.

What is claimed is:

1. A method of performing motion compensation using a processor executing code, comprising:
   receiving image data at a processor;
   dividing at least one frame of image data into blocks using the processor;
   performing phase plane correlation with the processor to determine a correlation surface for each block between a first frame and a second frame;

the processor producing a weighted correlation surface by multiplying each correlation surface by a blending coefficient and accumulating the weighted correlation surface into a global correlation surface;

selecting peaks in the global correlation surface using the processor; and performing sub-pixel motion vector calculations with the processor to produce global motion vectors using the peaks.

2. The method of claim 1, wherein adding the global correlation surface comprises multiplying the global correlation surface by a parameter based upon position of a block relative to an image boundary.

3. The method of claim 1, further comprising using the global correlation surface from a previous frame to refine the correlation surfaces for each block in the first frame.

4. The method of claim 3, wherein using the global correlation surface from a previous frame comprises adding the global correlation surface of the previous frame adjusted by a block boundary parameter to the correlation surfaces for each block in the first frame.

5. The method of claim 3, wherein adding the global correlation surface comprises populating a matrix with the global correlation surface and adding the correlation surfaces to the matrix.

6. The method of claim 1, wherein performing sub-pixel motion vector calculations comprises using the global correlation surface.

7. An apparatus, comprising:

a phase plane correlation module to produce correlation surfaces for each block of image data between a current frame and a previous frame of image data;

a global surface accumulation module to produce a global correlation surface between the current frame and a previous frame of image data by weighting the correlation surfaces for each block and accumulating the weighted correlation surfaces into the global correlation surface; and a global motion vector module to use the global correlation surface to perform sub-pixel modulation to produce global motion vectors for the current frame of image data.

* * * * *